(12) United States Patent
Smirnov

(10) Patent No.: US 12,069,370 B2
(45) Date of Patent: Aug. 20, 2024

(54) OPTICAL PATH CHANGING MODULE AND CAMERA MODULE

(71) Applicant: SAMSUNG ELECTRO-MECHANICS CO., LTD., Suwon-si (KR)

(72) Inventor: Viatcheslav Smirnov, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 203 days.

(21) Appl. No.: 17/407,759

(22) Filed: Aug. 20, 2021

(65) Prior Publication Data

US 2022/0159164 A1 May 19, 2022

(30) Foreign Application Priority Data

Nov. 16, 2020 (KR) .................. 10-2020-0152969

(51) Int. Cl.
*H04N 23/68* (2023.01)
*G02B 13/00* (2006.01)
(Continued)

(52) U.S. Cl.
CPC ....... *H04N 23/685* (2023.01); *G02B 13/0065* (2013.01); *G02B 27/646* (2013.01);
(Continued)

(58) Field of Classification Search
CPC ...... H04N 23/685; H04N 23/55; H04N 23/57; H04N 23/51; H04N 23/54; G02B 13/0065;
(Continued)

(56) References Cited

U.S. PATENT DOCUMENTS

| 2009/0115881 A1* | 5/2009 | Joo ................. H04N 23/51 |
| | | 348/E5.022 |
| 2018/0109660 A1 | 4/2018 | Yoon et al. |

(Continued)

FOREIGN PATENT DOCUMENTS

| CN | 107238913 A | 10/2017 |
| CN | 107357114 A | 11/2017 |

(Continued)

OTHER PUBLICATIONS

Korean Office Action issued on Jan. 17, 2022 in corresponding Korean Patent Application No. 10-2020-0152969. (8 pages in English and 6 pages in Korean).

(Continued)

*Primary Examiner* — Mekonnen D Dagnew
(74) *Attorney, Agent, or Firm* — NSIP Law

(57) ABSTRACT

An optical path changing module includes: a first rotational holder on which a reflective member configured to change a path of light is mounted; a second rotational holder supporting the first rotational holder; and a first elastic support portion disposed between the first rotational holder and the second rotational holder. The first elastic support portion includes: a first shaft disposed along a first rotational axis that is a rotational axis of the first rotational holder, and fastened to either one of the first rotational holder and the second rotational holder; a first bracket fastened to the other one of the first rotational holder and the second rotational holder and accommodating the first shaft therein; and first elastic members connecting the first shaft to the first bracket.

22 Claims, 16 Drawing Sheets

(51) Int. Cl.
*G02B 27/64* (2006.01)
*G02B 26/08* (2006.01)
*H04N 23/55* (2023.01)

(52) U.S. Cl.
CPC ...... *G02B 26/0816* (2013.01); *G02B 26/0883* (2013.01); *H04N 23/55* (2023.01)

(58) Field of Classification Search
CPC .............. G02B 27/646; G02B 26/0816; G02B 26/0883; G02B 26/101; G02B 7/182; G02B 7/1821; G03B 17/17; G03B 30/00
See application file for complete search history.

(56) References Cited

U.S. PATENT DOCUMENTS

| | | | |
|---|---|---|---|
| 2018/0224665 A1* | 8/2018 | Im | ........................ G02B 7/08 |
| 2020/0218082 A1 | 7/2020 | Choi et al. | |
| 2020/0333622 A1 | 10/2020 | Fujisaki et al. | |
| 2021/0080690 A1 | 3/2021 | Lee et al. | |

FOREIGN PATENT DOCUMENTS

| | | |
|---|---|---|
| CN | 107888834 A | 4/2018 |
| CN | 107942605 A | 4/2018 |
| JP | 2020-177067 A | 10/2020 |
| KR | 10-2015-0089675 A | 8/2015 |
| KR | 10-2018-0086762 A | 8/2018 |
| KR | 10-2019-0071569 A | 6/2019 |
| KR | 10-2020-0058365 A | 5/2020 |
| KR | 10-2020-0086482 A | 7/2020 |

OTHER PUBLICATIONS

Chinese Office Action Issued on Mar. 29, 2024, in Counterpart Chinese Patent Application No. 202111325052.2 (6 Pages in English, 11 Pages in Chinese).

* cited by examiner

OPTICAL PATH CHANGING MODULE AND CAMERA MODULE

CROSS-REFERENCE TO RELATED APPLICATIONS

This application claims benefit under 35 U.S.C § 119(a) of Korean Patent Application No. 10-2020-0152969 filed on Nov. 16, 2020 in the Korean Intellectual Property Office, the entire disclosure of which is incorporated herein by reference for all purposes.

BACKGROUND

1. Field

The following description relates to an optical path changing module and a camera module including an optical path changing module.

2. Description of Related Art

Recently, a camera has been employed in portable electronic devices such as smartphones, tablet PCs, laptops, and the like, and an autofocusing function, an image stabilization function, and a zoom function have been added to a camera for mobile terminals.

However, to implement various functions, a structure of the camera module has been complicated, and a size thereof has increased, such that a size of the portable electronic device on which the camera module is mounted has also increased.

Also, when a lens or an image sensor is directly moved for image stabilization, both a weight of the lens or the image sensor and weights of other members to which the lens or the image sensor is attached may need to be considered, and thus, a driving force above a certain level may be necessary, which may increase power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical path changing module includes: a first rotational holder on which a reflective member configured to change a path of light is mounted; a second rotational holder supporting the first rotational holder; and a first elastic support portion disposed between the first rotational holder and the second rotational holder. The first elastic support portion includes: a first shaft disposed along a first rotational axis that is a rotational axis of the first rotational holder, and fastened to either one of the first rotational holder and the second rotational holder; a first bracket fastened to the other one of the first rotational holder and the second rotational holder and accommodating the first shaft therein; and first elastic members connecting the first shaft to the first bracket.

The first rotational axis may extend through the reflective member.

Each of the first elastic members may be formed as a plate-shaped member, and ends of each of the first elastic members may be bent to form an acute angle.

The first elastic members may be radially disposed around the first shaft. One end of each of the first elastic members may be coupled to the first shaft, and another end of each of the first elastic members may be coupled to the first bracket.

The optical path changing module may further include conductive terminals coupled to the first bracket. The other end of each of the first elastic members may be connected to a respective one of the conductive terminals.

The first elastic member may be formed of a shape memory alloy.

The optical path changing module may further include a circuit board electrically connected to the conductive terminal and configured to supply a current to the first elastic member.

The first rotational holder may include a mounting surface on which the reflective member is mounted, and a shaft coupling portion disposed on a rear surface of the mounting surface and coupled to the first elastic support portion.

The second rotational holder may include two side portions disposed on opposite sides of the first rotational holder, respectively, and a connection portion connecting the two side portions. A second rotational shaft penetrating the two side portions may be disposed along a second rotational axis that is a rotational axis of the second rotational holder.

The optical path changing module may further include: a module case accommodating the second rotational holder; and a circuit board coupled to the module case. The second rotational holder may be coupled to the module case such that the second rotational holder is configured to rotate along the second rotational axis, with respect to the module case.

The optical path changing module may further include: a second elastic support portion disposed between the second rotational holder and the module case. The second elastic support portion may include: a second shaft disposed along the second rotational axis and coupled to either one of the second rotational holder and the module case; a second bracket fastened to the other one of the second rotational holder and the module case, and accommodating the second shaft therein; and second elastic members connecting the second shaft to the second bracket.

The optical path changing module may further include a second driver configured to rotate the second rotational holder about the second rotational axis. The second driver may include: a second magnet portion coupled to the second bracket; and a second coil portion disposed to oppose the second magnet portion, spaced apart from the second magnet portion, and coupled to the circuit board.

The optical path changing module may further include a first driver configured to rotate the first rotational holder about the first rotational axis.

The optical first driver may include: a first magnet portion coupled to the first bracket; and a first coil portion disposed to oppose the first magnet portion and spaced apart from the first magnet portion.

In another general aspect, a camera module includes: an optical path changing module including a rotational holder on which a reflective member configured to change a path of light is mounted; a module case accommodating the optical path changing module; and elastic members connecting the rotational holder to the module case. The elastic members are radially disposed around a rotational axis of the rotational holder. One end of each of the elastic members is fastened to the rotational holder, and another end of each of the elastic members is fastened to the module case.

The camera module may further include: a lens module accommodated in the module case and including lenses; and an image sensor module configured to convert light passing through the lenses into an electrical signal.

In another general aspect, a camera module includes: a module case; an optical path changing module disposed in an internal space of the module case, and including a first rotational holder on which a reflective member configured to change a path of light is mounted; a first shaft coupled to the module case and forming a rotational axis of the first rotational holder; and first elastic members extending radially outward from the first shaft and connecting the first rotational holder to the first shaft.

One end of each of the first elastic members may be connected to the first shaft, and another end of each of the first elastic members may be connected to the first rotational holder.

The camera module may further include a first ring-shaped bracket mounted in an opening in the rotational holder and disposed around the first shaft. One end of each of the first elastic members may be connected to the first shaft, and another end of each of the first elastic members may be connected to the first ring-shaped bracket.

The camera module may further include: a second rotational holder mounted on the first rotational holder and including a mounting surface on which the reflective member is mounted; a second shaft coupled to the first rotational holder and forming a rotational axis of the second rotational holder that is perpendicular to the rotational axis of the first rotational holder; and second elastic members extending radially outward from the second shaft and connecting the second rotational holder to the second shaft.

One end of each of the second elastic members may be connected to the second shaft, and another end of each of the second elastic members may be connected to the second rotational holder.

The camera module may further include a second ring-shaped bracket attached to the second rotation holder and disposed around the second shaft. One end of each of the second elastic members may be connected to the second shaft, and another end of each of the second elastic members may be connected to the second ring-shaped bracket.

Other features and aspects will be apparent from the following detailed description, the drawings, and the claims.

Figure 1:
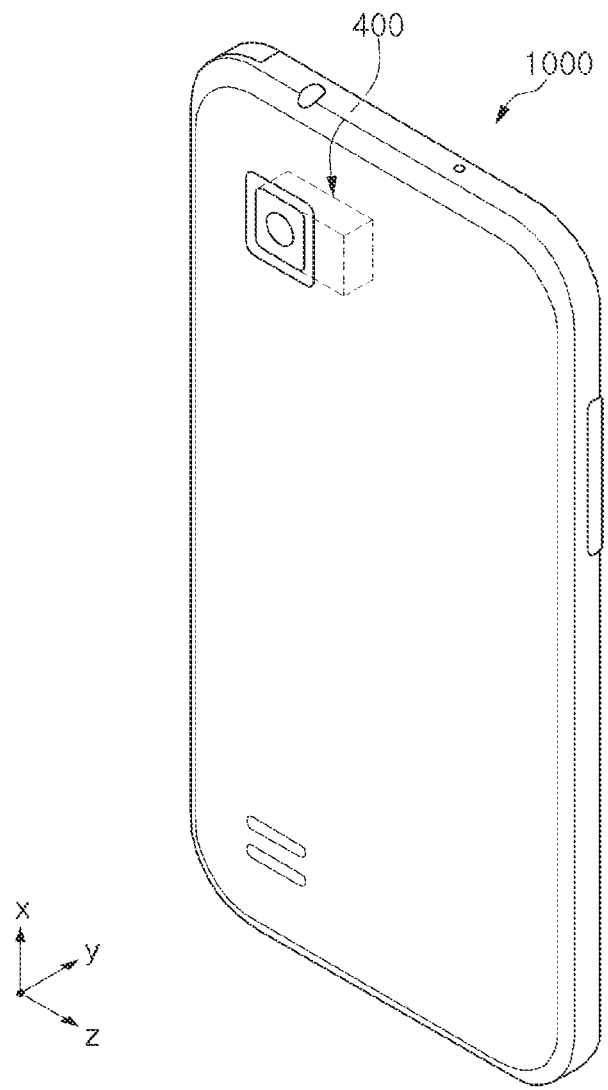
FIG. 1 is a perspective diagram illustrating a portable electronic device, according to an embodiment.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after an understanding of this disclosure. Further, although the examples described herein have a variety of configurations, other configurations are possible as will be apparent after an understanding of this disclosure.

FIG. 1 is a perspective diagram illustrating a portable electronic device, according to an embodiment.

Referring to FIG. 1, a portable electronic device 1000 may be a portable electronic device such as a mobile communication terminal including a camera module 400, a smartphone, or a tablet PC.

As illustrated in FIG. 1, the portable electronic device 1000 may include a camera module 400 configured to image a subject. The camera module 400 may include a plurality of lenses.

For example, the camera module 400, an optical axis (Z-axis) of the plurality of lenses may be disposed in sequence perpendicularly to a thickness direction (a Y-axis direction, a direction from a front surface of the portable electronic 1000 device to a rear surface or an opposite direction thereof) of the portable electronic device 1000. For example, the optical axis (Z-axis) of the plurality of lenses included in the camera module 400 may be formed in a width direction or a length direction of the portable electronic device 1000.

Therefore, even when the camera module 400 includes functions such as autofocusing (hereinafter, AF), zooming, and optical image stabilization (hereinafter, OIS), a thickness of the portable electronic device 1000 may not increase. Accordingly, the portable electronic device 1000 may have a reduced size.

Figure 2:
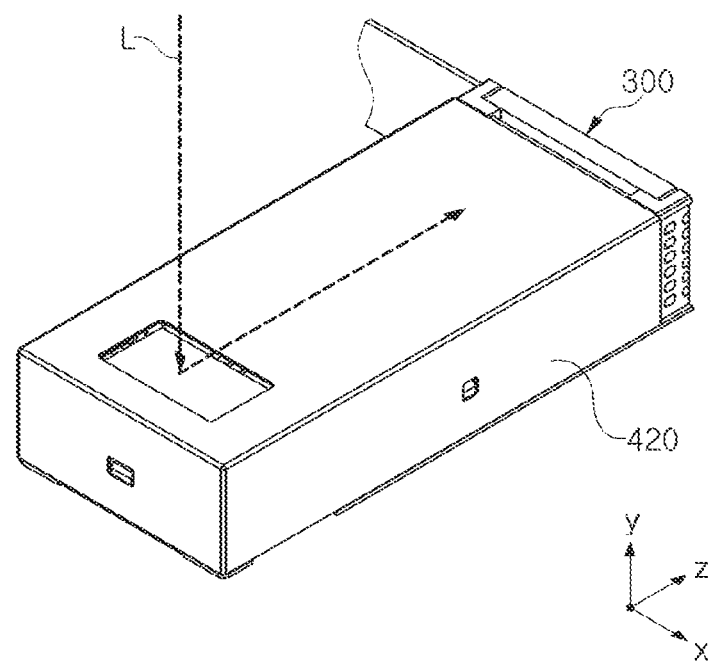
FIG. 2 is a perspective diagram illustrating a camera module, according to an embodiment.
Figure 3:
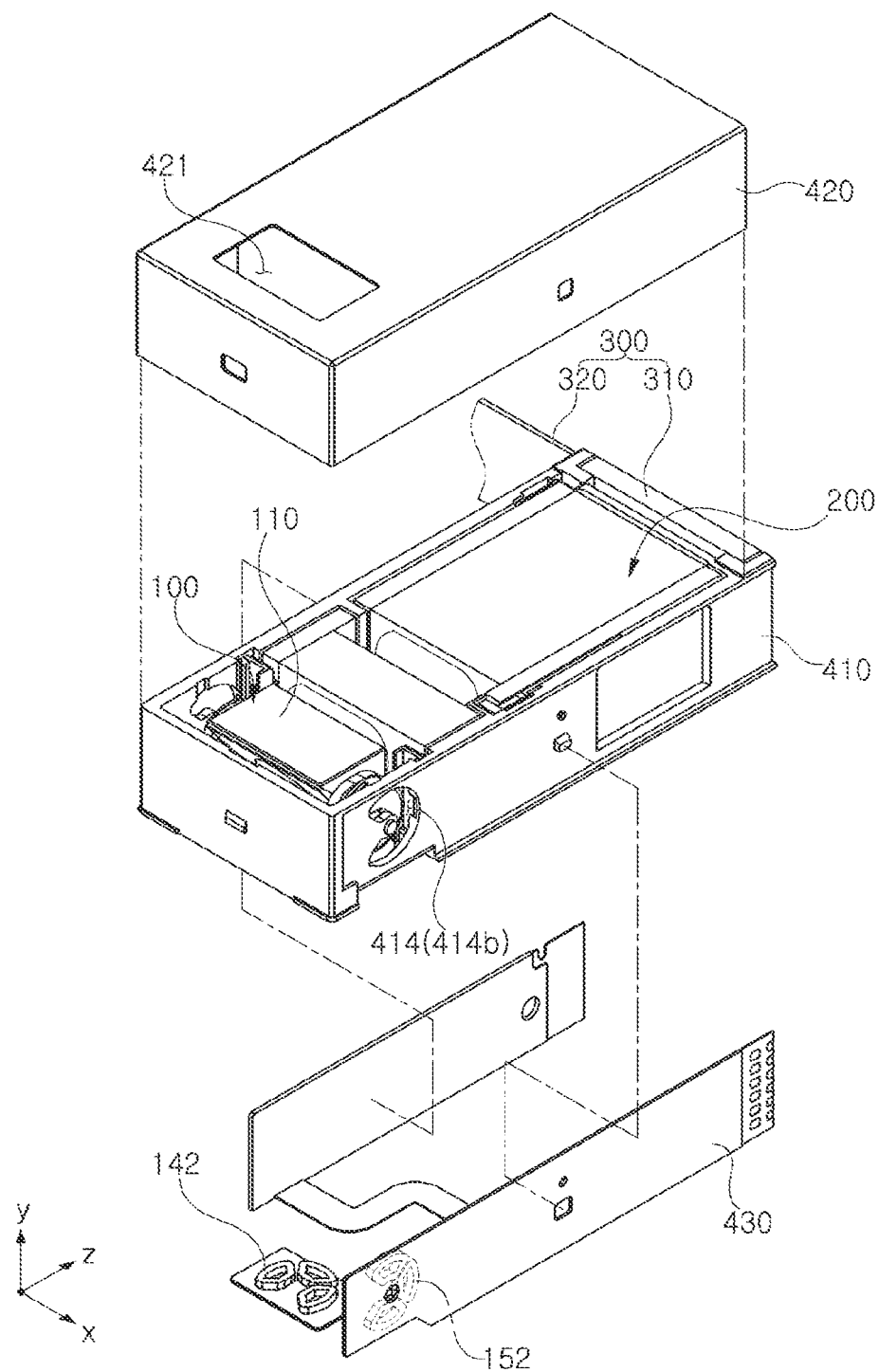
FIG. 3 is an exploded perspective diagram illustrating a portion of the camera module illustrated in FIG. 2.

FIG. 2 is a perspective diagram illustrating the camera module 400, according to an embodiment. FIG. 3 is an exploded perspective diagram illustrating a portion of the camera module 400.

Referring to FIGS. 2 and 3 together, the camera module 400 may include an optical path changing module 100, a lens module 200, and an image sensor module 300.

The optical path changing module 100 may change a traveling direction of light. For example, light L incident through an opening 421 of a module cover 420 may change in a traveling direction toward the lens module 200 through the optical path changing module 100. Accordingly, the traveling direction of the light L incident on the optical path changing module 100 may change to coincide with the optical axis (Z-axis) direction while passing through the optical path changing module 100. To this end, the optical path changing module 100 may include a reflective member 110 configured to change a path of light by reflecting incident light.

The lens module 200 may include a plurality of lenses through which light of which the traveling direction has been changed by the optical path changing module 100 passes. The image sensor module 300 may include an image sensor 310 and a printed circuit board 320 configured to convert light passing through the plurality of lenses into an electrical signal.

The optical path changing module 100, the lens module 200, and the image sensor module 300 may be disposed in the module case 410. The module case 410 may have an accommodating space therein, and the optical path changing module 100, the lens module 200, and the image sensor module 300 may be disposed in order in the accommodating space. A module cover 420 may be coupled to the module case 410 to form a complete case of the camera module.

Also, the circuit board 430 may be coupled to the module case 410. The circuit board 430 may be electrically connected to a driver and may provide an electrical signal to the driver. The circuit board 430 may be formed of an FPCB, but the circuit board 430 is not limited to being formed of an FPCB.

The circuit board 430 may be disposed along the external surface of the module case 410. The circuit board 430 may be formed in various shapes and may be coupled to the module case 410, and at least a portion of the circuit board 430 may be disposed to cover an opening 414 (including first and second openings 414*a* and 414*b*) of the module case 410.

The circuit board 430 may be a board including components for optical image stabilization (OIS) to correct shaking, such as a user's handshake, and may include a gyro sensor for detecting handshake. Also, a driver IC for providing a driving signal to a driver 160 (FIG. 5) may be included in the circuit board 430.

Figure 4:
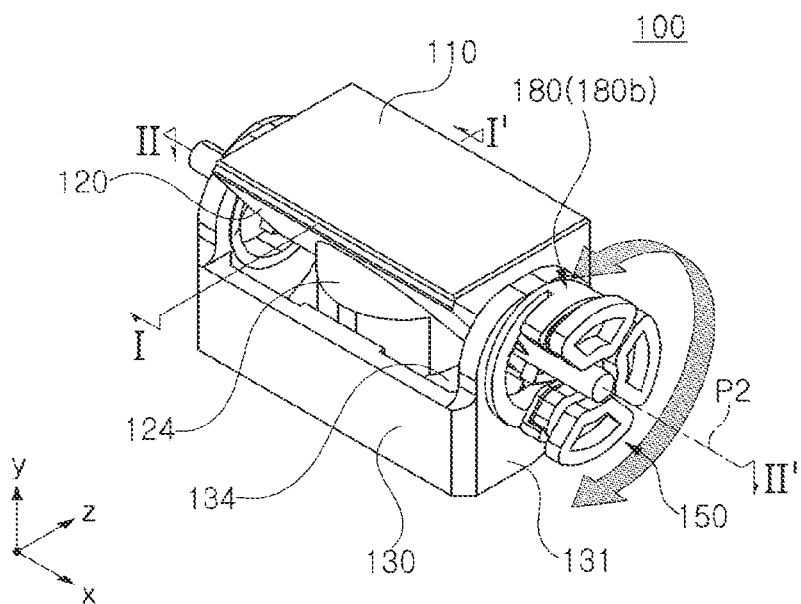
FIG. 4 is a perspective diagram illustrating an optical path changing module, according to an embodiment.
Figure 5:
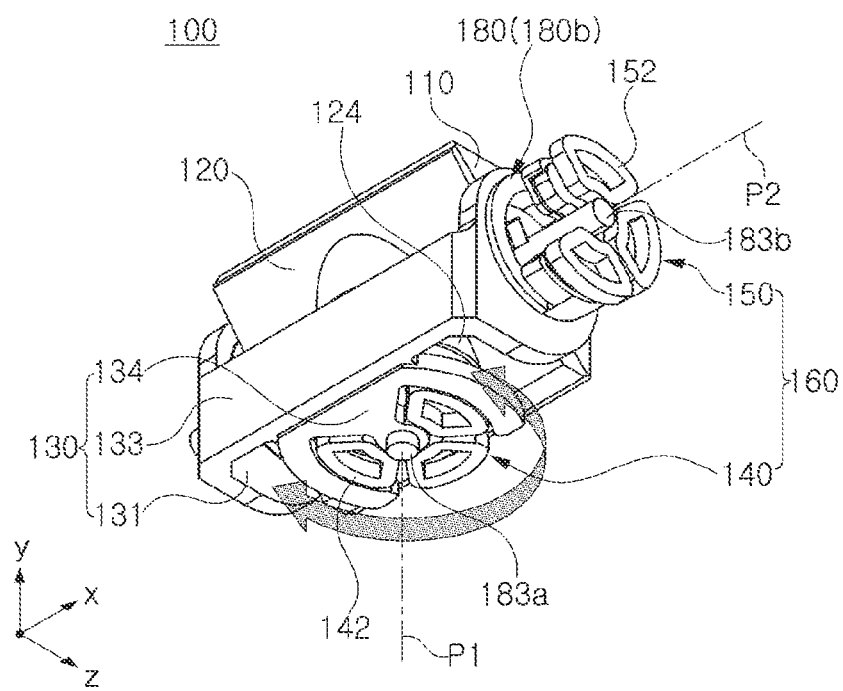
FIG. 5 is a perspective diagram illustrating the optical path changing module of FIG. 4, as viewed from below.
Figure 6:
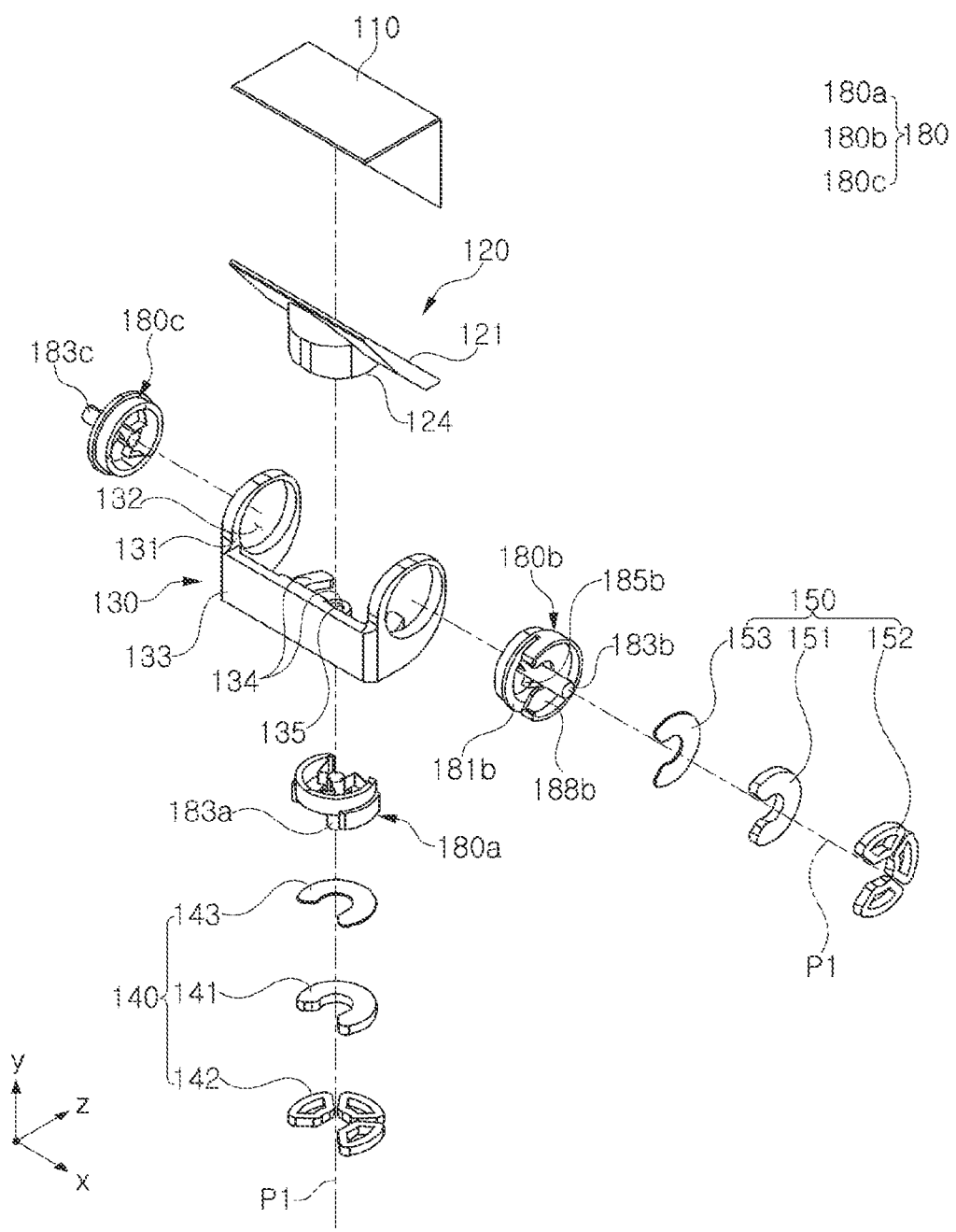
FIG. 6 is an exploded perspective diagram illustrating the optical path changing module illustrated in FIG. 4.
Figure 7:
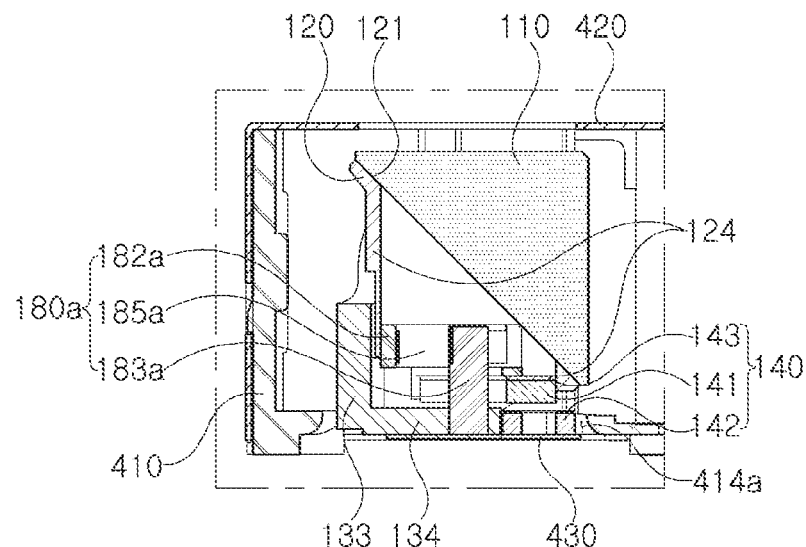
FIG. 7 is a cross-sectional diagram taken along line I-I' in FIG. 4.
Figure 8:
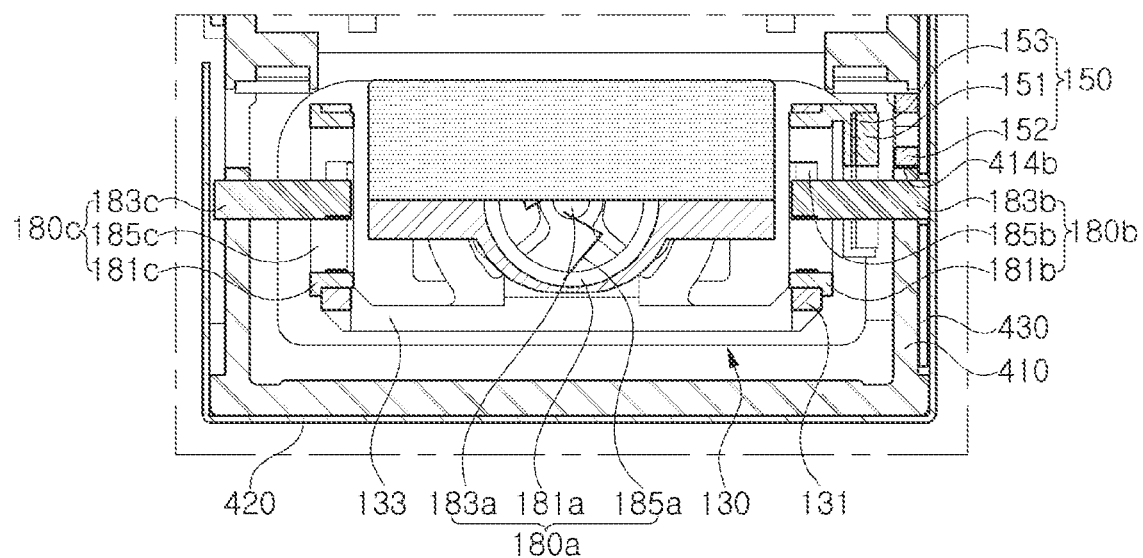
FIG. 8 is a cross-sectional diagram taken along line II-II' in FIG. 4.

FIG. 4 is a perspective diagram illustrating the optical path changing module 100, according to an embodiment. FIG. 5 is a perspective diagram illustrating the optical path changing module 100, as viewed from below. FIG. 6 is an exploded perspective diagram illustrating the optical path changing module 100. FIG. 7 is a cross-sectional diagram taken along line I-I' in FIG. 4. FIG. 8 is a cross-sectional diagram taken along line II-II' in FIG. 4.

Referring to FIGS. 4 to 8, the optical path changing module may include, for example, a reflective member 110, a first rotational holder 120 on which the reflection member 110 is mounted, a second rotational holder 130 configured to support the first rotational holder 120, and a driver 160.

The reflective member 110 may change a traveling direction of light. For example, a mirror or a prism that may reflect light may be used as the reflective member 110.

The reflective member 110 may be fixed to the first rotational holder 120. To this end, the first rotational holder 120 may include a mounting surface 121 on which the reflective member 110 is mounted, as shown in FIG. 6.

The mounting surface 121 of the first rotational holder 120 may be configured as an inclined surface. For example, the mounting surface 121 may be an inclined surface inclined by 45° with respect to the optical axis (Z-axis) of the plurality of lenses.

The first rotational holder 120 may be coupled to the second rotational holder 130 so as to be able to move within the second rotational holder 130. For example, the first rotational holder 120 may rotate about a first axis (Y-axis) in the second rotational holder 130. That is, the first rotational holder 120 may rotate about the first axis (Y-axis), with respect to the second rotation holder 130. Accordingly, the reflective member 110 may rotate about the first axis (Y-axis) along with the first rotational holder 120.

For example, a first rotational axis P1, which may be a rotational axis of the first rotational holder 120, and a second rotational axis P2, which may be a rotational axis of the second rotational holder, may be disposed to be perpendicular to each other. Also, the first rotational axis P1 and the second rotational axis P2 may be disposed to intersect with each other. The configuration in which the first rotational axis P1 and the second rotational axis P2 may be disposed to intersect each other may be a configuration in which that the first rotational axis P1 and the second rotational axis P2 meet on at least a single point.

Also, the first rotational axis P1 and the second rotational axis P2 may be arranged to pass through a reflection point of the reflective member 110 at which the light L incident to the optical path changing module 100 is refracted.

Also, the second rotational holder 130 may rotate about the second axis (X-axis) in the module case 410. Accordingly, the first rotational holder 120 and the reflective member 110 may also rotate about the second axis (X-axis) according to the movement of the second rotational holder 130.

In the example embodiment, the first axis (Y-axis) and the second axis (X-axis) may be axes perpendicular to the optical axis (Z-axis), and the first axis (Y-axis) and the second axis (X-axis) may be axes perpendicular to each other.

In the first rotational holder 120, a shaft coupling portion 124 may be disposed on a rear surface of the mounting surface 121. The shaft coupling portion 124 may be a portion on which the first rotational axis P1, which may be the rotational axis of the first rotational holder 120, is disposed, and may be rotatably coupled to the second rotational holder 130.

The first rotational axis P1 may be disposed to pass through the reflective member 110. More specifically, the first rotational axis P1 may be formed as a virtual shaft penetrating the shaft coupling portion 124 and the reflective member 110.

The second rotational holder 130 may be disposed to rotate about the second axis (X-axis) in the module case 410. Accordingly, the first rotational holder 120 and the reflective member 110 may rotate about the second axis (X-axis) along with the second rotational holder 130.

The second rotational holder 130 may be coupled to the first rotational holder 120 to surround the first rotational holder 120. The second rotational holder 130 may include side portions 131 disposed on both side surfaces of the first rotational holder 120, respectively, and a connection portion 133 connecting the two side portions 131 to each other.

Since the first rotational holder 120 may need to rotate along the first rotational axis P1 in the second rotational holder 130, the first rotational holder 120 may be spaced apart from the side portion 131 by a predetermined distance to prevent interference therebetween. Therefore, the distance between the two side portions 131 may be configured to be greater than a width of the first rotational holder 120.

The second rotational axis P2 may be formed by a rotational shaft of the second rotational holder 130, which may be disposed on the two side portions 131.

The second rotational axis P2 may be formed as a virtual shaft penetrating the two side portions 131 and the module case 410. For example, the second rotational axis P2 may be formed in a direction perpendicular to the side portion 131.

The second rotational holder 130 may include a holder support portion 134 protruding from the connection portion 133 toward a side of the first rotational holder 120. To provide a space in which the first rotational holder 120 may rotate, the holder support portion 134 may protrude by a predetermined distance from the connection portion 133, and the first rotational axis P1 may be disposed on an end of the holder support portion 134.

The holder support portion 134 may be disposed below the shaft coupling portion 124 and may be spaced apart from the shaft coupling portion 124 by a predetermined distance. A first elastic support portion 180*a* (FIGS. 6 to 8) may be disposed between the holder support portion 134 and the shaft coupling portion 124.

A first shaft 183*a* may be fastened to the holder support portion 134. Accordingly, a fastening hole 135 to which the first shaft 183*a* is fastened may be disposed in the holder support portion 134 along the first rotational axis P1.

An elastic support portion 180 may include the first elastic support portion 180*a*, a second elastic support portion 180*b*, and a third elastic support portion 180*c*.

In the example embodiment, the first rotational holder 120 may be coupled to the second rotational holder 130 by the first elastic support portion 180*a*. Also, the second rotational holder 130 may be coupled to the module case 410 by the second elastic support portion 180*b* and the third elastic support portion 180*c*.

The first elastic support portion 180*a*, the second elastic support portion 180*b*, and the third elastic support portion 180*c* may have similar basic configurations, and may only have differences in shapes of respective first, second, and third brackets 181*a*, 181*b*, and 181*c* thereof.

Therefore, the third elastic support portion 180*c* including only the basic configuration will be described first. Detailed configurations of the third elastic support portion 180*c* may be similarly applied to the first elastic support portion 180*a* and the second elastic support portion 180*b*.

Figure 9:
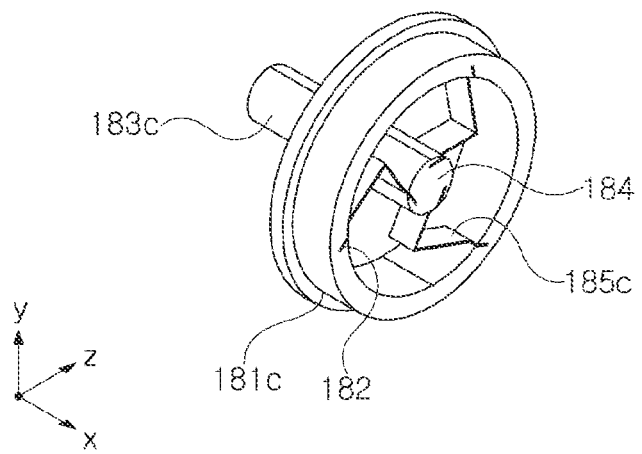
FIG. 9 is an enlarged perspective diagram illustrating a third elastic support portion illustrated in FIG. 6.
Figure 10:
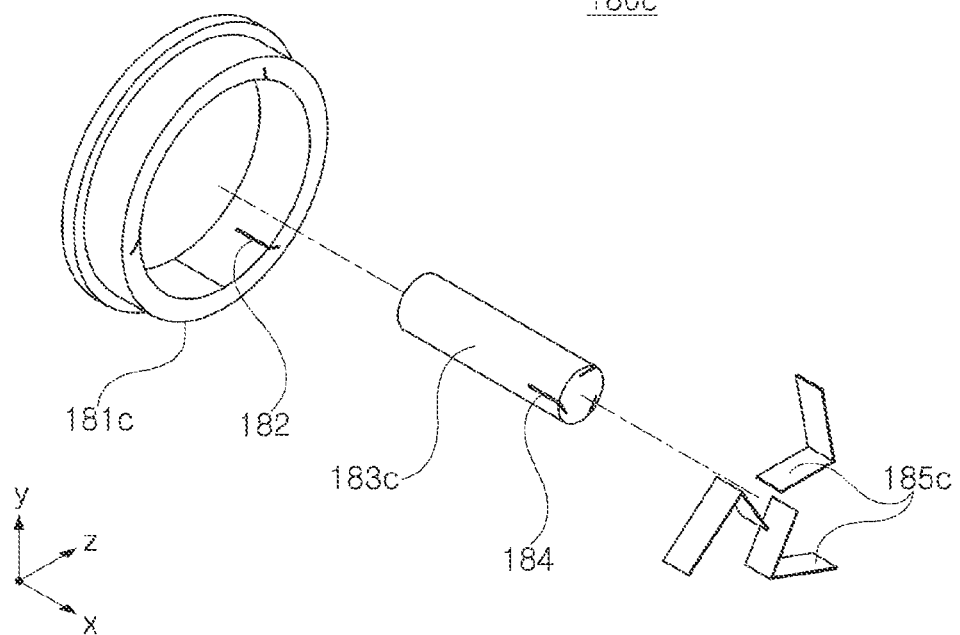
FIG. 10 is an exploded perspective diagram illustrating a third elastic support portion illustrated in FIG. 9.

FIG. 9 is an enlarged perspective diagram illustrating the third elastic support portion illustrated 180c. FIG. 10 is an exploded perspective diagram illustrating the third elastic support portion 180c.

Referring to FIGS. 9 and 10 together, the third elastic support portion 180c may include a third bracket 181c, a third shaft 183c, and a third elastic member 185c.

The third bracket 181c may be inserted and disposed in the side portion 131 of the second rotational holder 130, and may be formed in a hollow ring shape.

The third elastic member 185c may be disposed in the third bracket 181c. If the third elastic member 185c were to protrude externally of the third bracket 181c, interference with the other elements may occur. Accordingly, the entire third elastic member 185c may be disposed in an internal space of the third bracket 181c, and to this end, the third bracket 181c may have a width equal to or wider than a width of the third elastic member 185c.

A through-hole shaped space may be formed in the third bracket 181c, and the third shaft 183c may be disposed on a center of the internal space of the third bracket 181c.

The third shaft 183c may be formed in a bar shape, and may be disposed on the center of the third bracket 181c by penetrating the internal space of the third bracket 181c. In this case, the third shaft 183c may be disposed along the second rotational axis P1.

The third shaft 183c may be coupled to the third bracket 181c by the third elastic member 185c. Accordingly, the third shaft 183c may not be in contact with the third bracket 181c by the third elastic member 185c, and the spacing with the third bracket 181c may be maintained.

A plurality of third elastic members 185c may be provided, and one end of each of the of third elastic members 185c may be fastened to the third shaft 183c and the other end of each of the third elastic members 185c may be fastened to the third bracket 181c to provide an elastic force to the third shaft 183c or the third bracket 181c. To this end, insertion grooves 182 and 184 to which the third elastic member 185c is coupled may be provided on an internal circumferential surface of the third bracket 181c and an external circumferential surface of the third shaft 183c, respectively. As shown in FIGS. 9 and 10, the insertion grooves 182 and 184 may be formed in a slit shape corresponding to a thickness of the third elastic member 185c. Accordingly, when the shape of the third elastic member 185c changes, the shape of the insertion grooves 182 and 184 may also change.

The plurality of third elastic members 185c may be spaced apart from each other by a constant distance. For example, the plurality of third elastic members 185c may be radially disposed around the second rotational axis P2 on which the third shaft 183c is disposed and may connect the third shaft 183c to the third bracket 181c.

The third elastic member 185c may be formed by bending a plate-shaped member such as a metal plate in at least one location. Accordingly, when an external force acts in a direction in which the bent portion is unfolded or folded, the third elastic member 185c may provide a restoring force corresponding to the external force. For example, the third elastic member 185c may be bent such that both ends may form an acute angle, and may be formed of a metal, an alloy, or an engineering plastic material.

However, the third elastic member 185c is not limited to the above-described shape and may have various shapes as long as the third elastic member 185c may provide an elastic force between the third bracket 181c and the third shaft 183c. For example, a torsion spring may be used as the third elastic member 185c.

The third elastic support portion 180c configured as described above may be coupled to the side portion 131 as the third bracket 181c is inserted into the insertion hole 132 of the side portion 131. Also, the third shaft 183c may be disposed along the second rotational axis P2 in a position spaced apart from the first rotational holder 120 by a predetermined distance, and one end of the third shaft 183c may be coupled to the module case 410.

Therefore, when the second rotational holder 130 rotates about the second rotational axis P2, the third bracket 181c may rotate together with the second rotational holder 130, and the third shaft 183c fastened to the module case 410 may not rotate. Accordingly, the third elastic member 185c may be elastically deformed by a displacement by which the second rotational holder 130 rotates.

Figure 11:
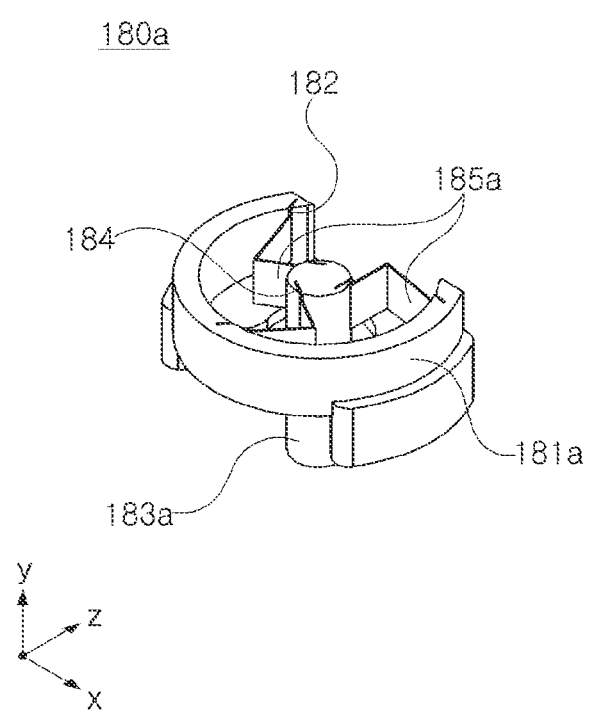
FIG. 11 is an enlarged perspective diagram illustrating a first elastic support portion illustrated in FIG. 6.
Figure 12:
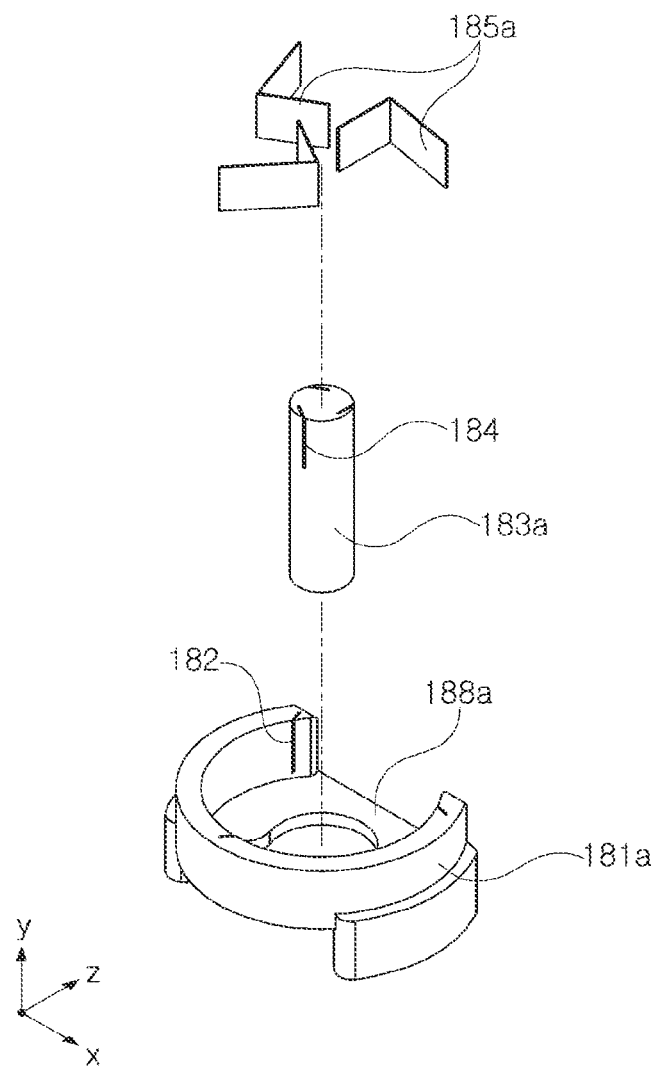
FIG. 12 is an exploded perspective diagram illustrating a first elastic support portion illustrated in FIG. 11.

FIG. 11 is an enlarged perspective diagram illustrating the first elastic support portion 180a. FIG. 12 is an exploded perspective diagram illustrating the first elastic support portion 180a.

Referring to FIGS. 11 and 12 together, the first elastic support portion 180a may include the first bracket 181a, a first shaft 183a, and first elastic members 185a. The basic configurations of the first bracket 181a, the first shaft 183a, and the first elastic member 185a may be the same as those of the third bracket 181c, the third shaft 183c, and the third elastic member 185c, respectively, and thus, the descriptions of the same configuration will not be provided.

In the first elastic support portion 180a, the first bracket 181a may be fastened to the shaft coupling portion 124 of the first rotational holder 120. Specifically, the first bracket 181a may be bonded to a lower surface of the shaft coupling portion. In this case, the first shaft 183a may not be in contact with the shaft coupling portion 124 and may be spaced apart from the shaft coupling portion 124 by a predetermined distance.

The first shaft 183a may be disposed along the first rotational axis P1, and one end of the first shaft 183a may be fastened to the holder support portion 134 of the second rotational holder 130. Also, the first elastic members 185a may be radially disposed around the first shaft 183a, and each of the first elastic members 185a may have one end fixed and coupled to the first shaft 183a and the other end fixed and coupled to the first bracket 181a.

Therefore, when the first rotational holder 120 rotates about the first rotational axis P1, the first bracket 181a may rotate together with the first rotational holder 120, and the first shaft 183a, which is fastened to the second rotational holder 130, may not rotate. Accordingly, the first elastic member 185a may be elastically deformed by a displacement by which the first rotational holder 120 rotates.

The first bracket 181a may include a first seating portion 188a on which a first driver 140 of the driver 160 is disposed.

The first seating portion 188a may be formed to partially block the through-hole of the first bracket 181a, and may be form a space in which a first magnet portion 141 is seated. Accordingly, the first seating portion 188a may have various shapes as long as the first magnet portion 141 may be stably seated therein.

As shown in FIGS. 4 to 8, the second elastic support portion 180b may include the second bracket 181b, a second shaft 183b, and second elastic members 185b. The second elastic support portion 180b may be configured similarly to the third elastic support portion 180c and may be coupled to the side portion 131 disposed opposite to the side portion 131 to which the third elastic support portion 180c is coupled.

In the second elastic support portion 180b, similarly to the third elastic support portion 180c, the second bracket 181b may be fastened to the side portion 131 of the second rotational holder 130, and the second shaft 183b may be accommodated in the second bracket 181b and may be coupled to the module case 410 along the second rotational axis P2. Also, the second elastic members 185b may be radially disposed around the second shaft 183b, and each of the second elastic members 185b may have one end fixed and coupled to the second shaft 183b and the other end fixed and coupled to the second bracket 181b.

Therefore, when the second rotational holder 130 rotates about the second rotational axis P2, the second bracket 181b may rotate together with the second rotational holder 130, and the second shaft 183b, which is fastened to the module case 410, may not rotate. Accordingly, the second elastic member 185b may be elastically deformed by a displacement by which the second rotational holder 130 rotates.

Similarly to the first elastic support portion 180a, the second bracket 181b may include a second seating portion 188b in which a second driver 150 of the driver 160 is disposed.

The second seating portion 188b may be formed to partially block the through-hole of the second bracket 181b, and may be used as a space in which a second magnet portion 151 is seated. Therefore, the second seating portion 188b may have various shapes as long as the second magnet portion 151 may be stably seated in the second seating portion 188b.

In an example, the driver 160 may not be disposed on the side portion 131 on which the third elastic support portion 180c is disposed. Accordingly, the third elastic support portion 180c may not include an element corresponding to the second seating portion 188b. However, the disclosure is not limited to this example, and when the driver 160 is additionally disposed on the side portion 131 on which the third elastic support portion 180c is disposed, the third elastic support portion 180c may be configured the same as or similarly to the second elastic support portion 180b.

In the optical path changing module 100, the first, second, and third shafts 183a, 183b, and 183c may be connected to the first, second, and third brackets 181a, 181b, and 181c, respectively, by the first, second, and third elastic members 185a, 185b, and 185c, respectively. Accordingly, the first rotational holder 120 may be substantially connected to the second rotational holder 130 through the first elastic members 185a, and the second rotational holder 130 may be connected to the module case 410 through the second and third elastic members 185b and 185c.

Therefore, the first rotational holder 120 may not be fixed or fastened to the second rotational holder 130, and may be coupled to be able to move within the range in which the first elastic members 185a are elastically deformed, and the second rotational holder 130 may not be immovably fixed or fastened to the module case 410, and may be coupled to be able to move within the range in which the second and third elastic members 185b and 185c are elastically deformed.

Accordingly, when an external force acts, the first, second, and third shafts 183a, 183b, and 183c may move linearly and rotationally within the first, second and third brackets 181a, 181b, and 181c, respectively. For example, in the case of the first elastic support portion 180a, the first shaft 183a may rotate about the Y-axis, which is the first rotational axis P1, and may linearly move along the XZ plane. Similarly, in the case of the second and third elastic support portions 180c, the second and third shafts 183c may rotate about the X-axis, which is the second rotational axis P2, and may move linearly along the Y-Z plane.

The driver 160 may provide a driving force such that the first rotational holder 120 may rotate about the first axis and the second rotational holder 130 may rotate about the second axis.

Referring to FIGS. 5, 6, and 8, for example, the driver 160 may include a first magnet portion 141, a second magnet portion 151, a first coil portion 142 spaced apart from the first magnet portion 141, and a second coil portion 152 paced apart from the second magnet portion 151. The first magnet portion 141 and the first coil portion 142 oppose each other, and the second magnet portion 151 and the second coil portion 152 oppose each other.

When power is applied to the first coil portion 142 or the second coil portion 152, the first rotational holder 120, on which the first magnet portion 141 is mounted, or the second rotational holder 130, on which the second magnet portion 151 is mounted, may rotate about the first axis (Y-axis) or the second axis (X-axis).

For example, the driver 160 may include the first driver 140 for rotating the first rotational holder 120 and the second driver 150 for rotating the second rotational holder 130.

The first driver 140 may include the first magnet portion 141 mounted on the first elastic support portion 180a, and a first coil portion 142 disposed to oppose the first magnet portion 141.

The first magnet portion 141 may include one or more magnets, and may be coupled to the first seating portion 188a, which forms a lower surface of the first bracket 181a.

The first coil portion 142 may include one coil or a plurality of coils, and, as illustrated in FIG. 7, may be mounted on the circuit board 430 in a position opposing the first magnet portion 141. To this end, the first opening 414a may be formed in the module case 410, in a region opposing the first magnet portion 141, and at least a portion of the circuit board 430 may cover the first opening 414a. Also, at least a portion of the first coil portion 142 may be disposed in the first opening 414a of the module case 410.

A yoke 143 may be disposed between the first magnet portion 141 and the first seating portion 188a to form an efficient magnetic path. The yoke 143 may be formed of a metal material and may induce a flow of a magnetic field, thereby improving strength of the magnetic field.

The second driver 150 may include the second magnet portion 151 mounted on the second elastic support portion 180b, and the second coil portion 152 disposed to oppose the second magnet portion 151.

In the illustrated embodiment, the second driver 150 may be mounted on only one of the two side portions 131. However, the disclosure is not limited to this configuration, and the second driver 150 may be mounted on both of the two side portions 131.

The second magnet portion 151 may include one or more magnets, and may be coupled to the second seating portion 188b of the second bracket 181b.

The second coil portion 152 may include one or more coils, and may be mounted on the circuit board 430 in a position opposing the second magnet portion 151. To this end, the second opening 414b may be formed in the module case 410, in a region opposing the second magnet portion 151, and at least a portion of the circuit board 430 may cover the second opening 414b of the module case 410. Also, at least a portion of the second coil portion 152 may be disposed in the second opening 414b.

Similarly to the first driver 140, the yoke 153 may be disposed between the second magnet portion 151 and the second seating portion 188b to form an efficient magnetic path.

The camera module 400 may rotate the optical path changing module 100 to compensate for blurring of an image or shaking of a video due to factors such as user's handshake during obtaining an image or a video.

For example, when shaking occurs during obtaining an image or a video due to a user's handshake, a relative displacement corresponding to the shaking may be provided to the first rotational holder 120 and the second rotational holder 130, thereby compensating for the shaking.

As described above, an OIS function may be implemented by rotating the reflective member 110 having a relatively light weight, rather than directly moving the lens module 200 or the image sensor 310. Thus, power consumption of the camera module 400 may be reduced.

Also, in the optical path changing module 100, the first rotating shaft P1 may be disposed below the mounting surface 121 on which the reflective member 110 is mounted. Also, the first rotational axis P1 and the second rotational axis P2 may be disposed to intersect with each other. Accordingly, a rotational radius of the reflective member 110 may be decreased, such that a size of the camera module 400 may be reduced.

Also, since the first rotational holder 120 may be connected to the second rotational holder 130 by the first elastic member 185a, and the second rotational holder 130 may be connected to the module case 410 by the second and third elastic members 185b and 185c, even when an external impact is applied, the impact may be absorbed by a buffer effect of the first, second, and third elastic members 185a, 185b, and 185c. Accordingly, the breakage of the rotational axis caused by an impact may be reduced.

Also, when the first rotational holder 120 or the second rotational holder 130 is rotated by the driver 160, the first, second, and third elastic members 185a, 185b, and 185c of the first, second and third elastic support portions 180a, 180b, and 180c, respectively, may be elastically deformed. Therefore, when the driving force of the driver 160 is removed, the first rotational holder 120 or the second rotational holder 130 may swiftly return to its original position by the restoring force of the first, second, and third elastic members 185a, 185b, and 185c. Accordingly, power consumption of the camera module 400 may be reduced.

The first driver 140 may be disposed below the first rotational holder 120, and the second driver 150 may be disposed on the side surface of the second rotational holder 130. However, this disclosure is not limited to such a configuration. The driver 160 may be disposed in various positions as long as the first rotational holder 120 may rotate along the first rotational axis and the second rotational holder 130 may rotate along the second rotational axis. For example, the first driver 140 may be disposed between the shaft coupling portion 124 and the connecting portion 133. In this case, the first magnet portion 141 and the first coil portion 142 may be disposed on surfaces on which the connection portion 133 and the shaft coupling portion 124 may oppose each other.

This disclosure is not limited to the above-described example embodiments, and various modifications may be made.

Figure 13:
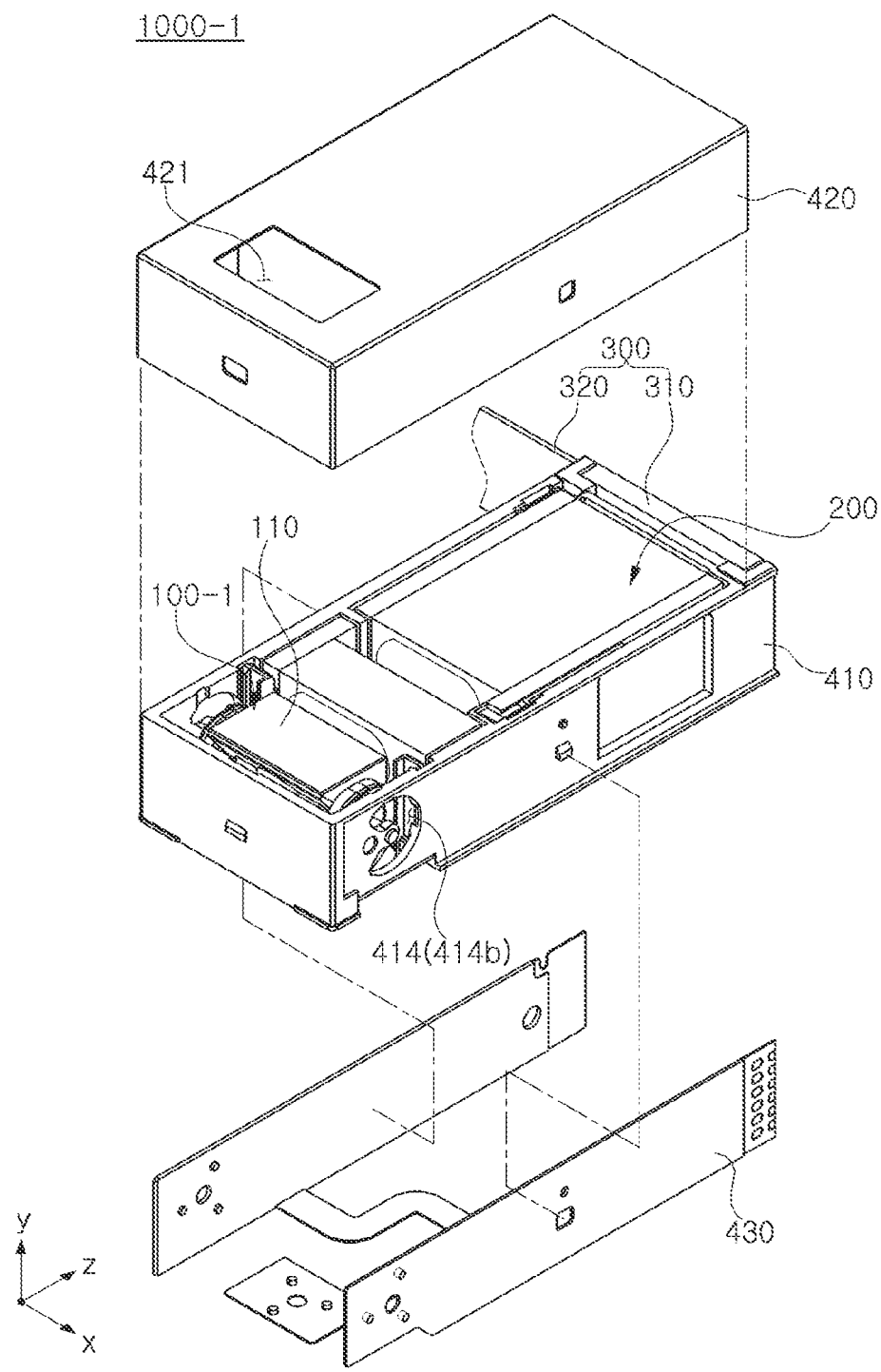
FIG. 13 is an exploded perspective diagram illustrating a portion of a camera module, according to an embodiment.
Figure 14:
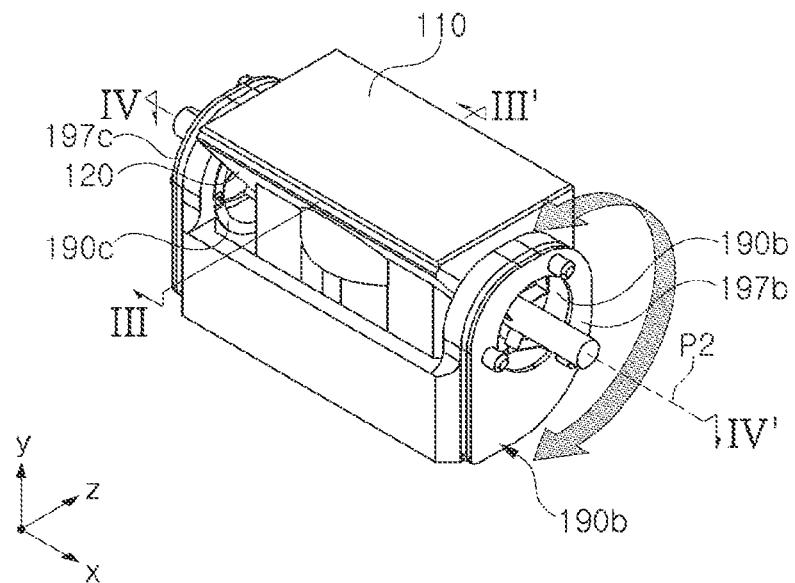
FIG. 14 is a perspective diagram illustrating an optical path changing module illustrated in FIG. 13.
Figure 15:
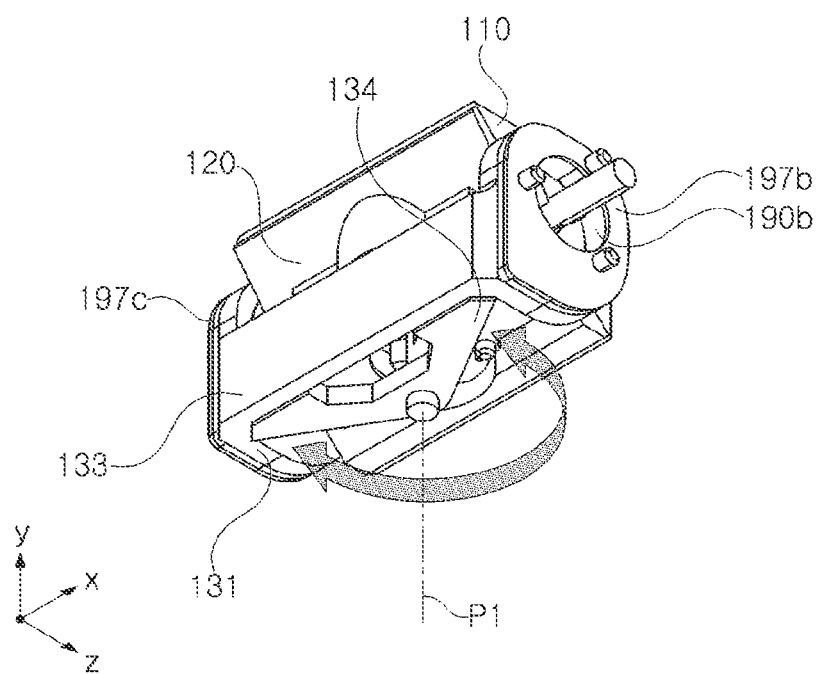
FIG. 15 is a perspective diagram illustrating the optical path changing module illustrated in FIG. 14, as viewed from below.
Figure 16:
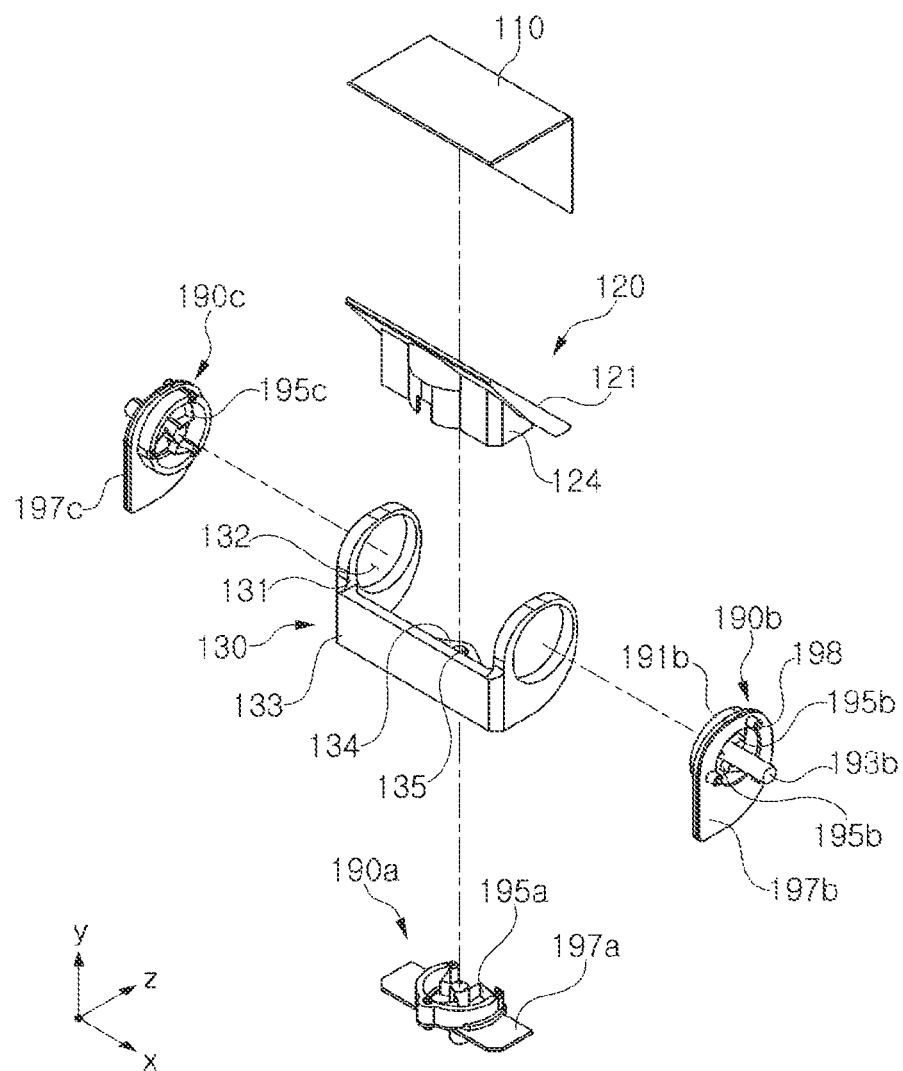
FIG. 16 is an exploded perspective diagram illustrating the optical path changing module illustrated in FIG. 14.
Figure 17:
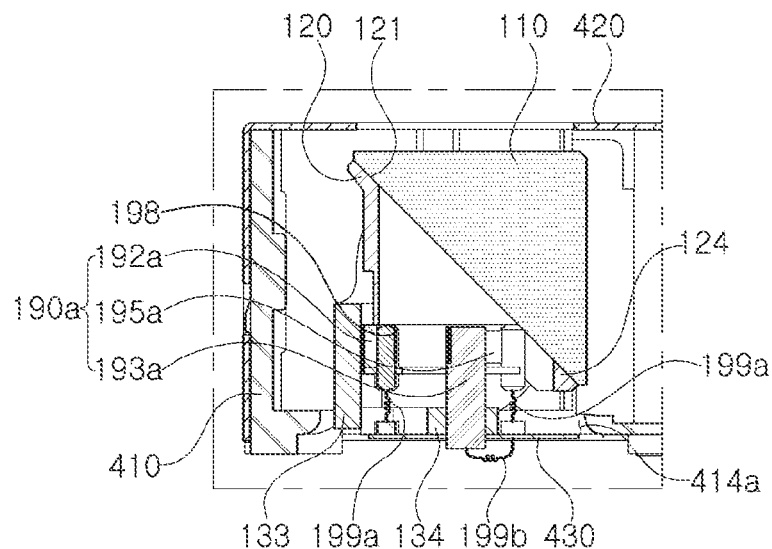
FIG. 17 is a cross-sectional diagram taken along line III-III' in FIG. 14.
Figure 18:
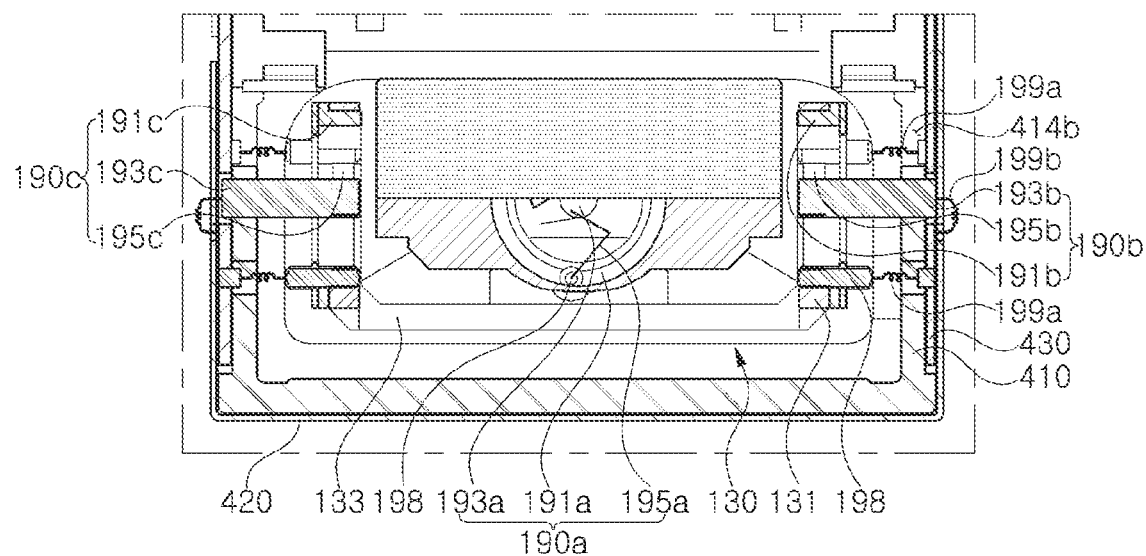
FIG. 18 is a cross-sectional diagram taken along line IV-IV' in FIG. 14.

FIG. 13 is an exploded perspective diagram illustrating a portion of a camera module 1000-1, according to an embodiment. FIG. 14 is a perspective diagram illustrating an optical path changing module 100-1 illustrated in FIG. 13. FIG. 15 is a perspective diagram illustrating the optical path changing module 100-1. FIG. 16 is an exploded perspective diagram illustrating the optical path changing module 100-1. FIG. 17 is a cross-sectional diagram taken along line III-III' in FIG. 14. FIG. 18 is a cross-sectional diagram taken along line IV-IV' in FIG. 14.

Referring to FIGS. 13 to 18, the optical path changing module 100-1 may be configured similarly to the optical path changing module 100 of the previously described embodiment, except that first, second, and third elastic members 195a, 195b, and 195c may also provide the function of a driver.

The optical path changing module 100-1 may not include the magnet portion and the coil portion included in the driver 160 in the previously described embodiment, and may be configured to supply a current to the first, second, and third elastic members 195a, 195b, and 195c.

To this end, a first connection board 197a may be coupled to a first elastic support portion 190a, a second connection board 197b may be coupled to a second elastic support portion 190b, and a third connection board 197c may be coupled to a third elastic support portion 190c.

Figure 19:
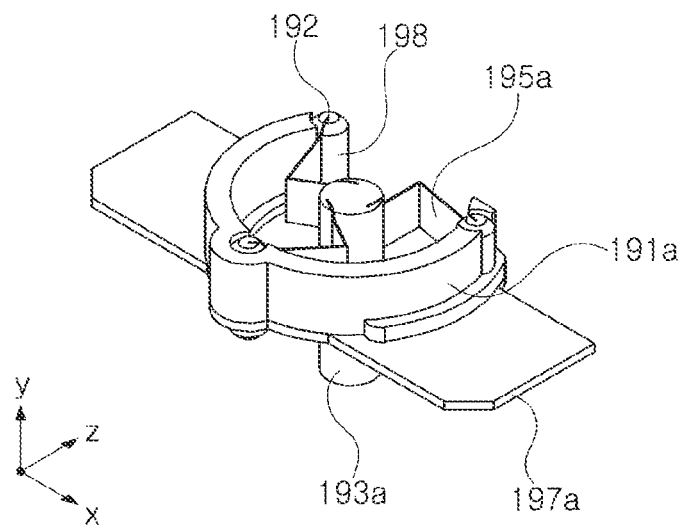
FIG. 19 is an enlarged perspective diagram illustrating a first elastic support portion illustrated in FIG. 16.
Figure 20:
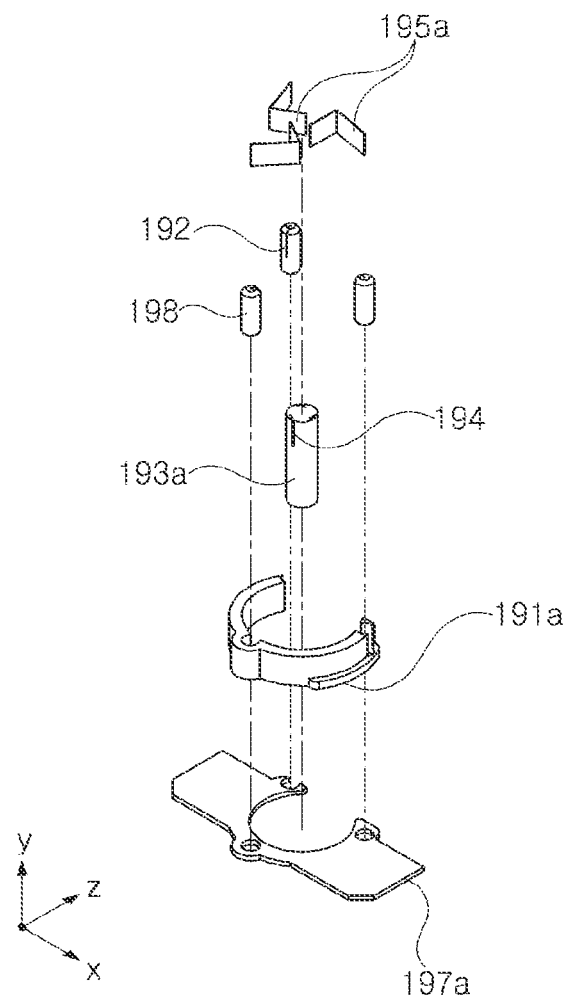
FIG. 20 is an exploded perspective diagram illustrating the first elastic support portion illustrated in FIG. 19.

FIG. 19 is an enlarged perspective diagram illustrating the first elastic support portion illustrated 190a. FIG. 20 is an exploded perspective diagram illustrating the first elastic support portion 190a.

Referring to FIGS. 19 and 20 together, a first bracket 191a of the first elastic support portion 190a may include a plurality of conductive terminals 198, and each of the first elastic members 195a may be coupled to the respective conductive terminal 198.

The conductive terminals 198 may be formed in a pillar shape and may be inserted and fixed to the first bracket 191a. However, the conductive terminals 198 are not limited to a pillar shape, and the conductive terminals 198 may be modified in various forms as long as the conductive terminals 198 may be firmly fastened to the first bracket 191a and may electrically connect the first elastic member 195a to the first connection board 197a.

The conductive terminals 198 may be disposed side by side with a first shaft 193a, and may be spaced apart from each other by a predetermined distance on the first bracket 191a. One end of the first elastic member 195a may be coupled to the first shaft 193a, and may be inserted into an insertion groove 194 of the first shaft 193a.

The other end of the first elastic member 195a may be coupled to the conductive terminal 198 rather than the first bracket 191a. Accordingly, the conductive terminal 198 may include an insertion groove 192 into which the other end of the first elastic member 195a is inserted. The insertion groove 192 of the conductive terminal 198a may be formed in a slit shape similarly to the insertion groove 194 of the first shaft 193a.

The first connection board 197a may be coupled to the first bracket 191a, and one end of the conductive terminals 198 may be bonded to the first connection board 197a. The first connection board 197a may be electrically connected to the circuit board 430 to supply a current to the first elastic member 195a through the conductive terminals 198. The conductive terminals 198 may be electrically connected to the circuit board 430 through connection wires 199a and 199b, as shown in FIG. 17.

Since one side of the first bracket 191a is coupled to the shaft coupling portion 124, the first connection board 197a may be coupled to the other side of the first bracket 191a.

Also, the conductive terminals 198 may be bonded to the first connection board 197a by penetrating the first connection board 197a.

Since the first shaft 193a is disposed in the first connection board 197a, an opening or a groove in which the first shaft 193a is disposed may be provided in the first connection board 197a.

Figure 21:
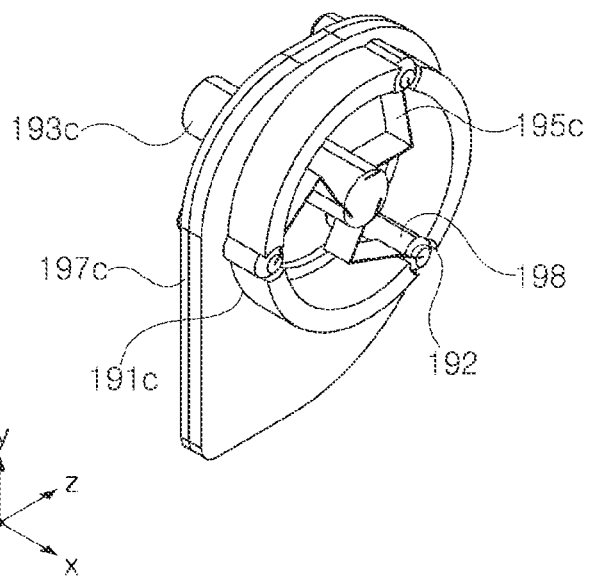
FIG. 21 is a perspective diagram illustrating a third elastic support portion illustrated in FIG. 16.
Figure 22:
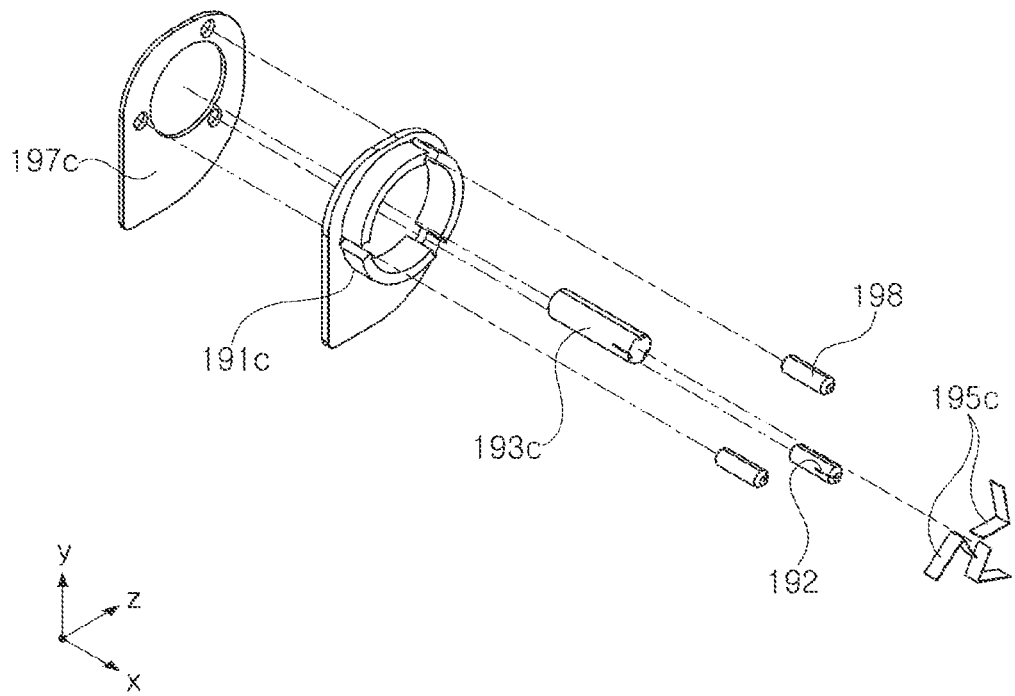
FIG. 22 is an exploded perspective diagram illustrating the third elastic support portion illustrated in FIG. 21.

FIG. 21 is a perspective diagram illustrating the third elastic support portion 190c. FIG. 22 is an exploded perspective diagram illustrating the third elastic support portion 190c.

The second elastic support portion 190b and the third elastic support portion 190c may be configured the same and may have structures that are vertically symmetrical with respect to each other, with respect to the first rotational axis P1. Accordingly, a detailed configuration of the second elastic support portion 190b will also be described with reference to FIGS. 21 and 22 in which the third elastic support portion 190c is illustrated.

The second elastic support portion 190b and the third elastic support portion 190c may include the conductive terminals 198, similarly to the above-described first elastic support portion 190a, and the second elastic members 195b and the third elastic members 195c may be fastened to the corresponding conductive terminals 198, respectively. Also, a second connection board 197b and a third connection board 197c may be coupled to external surfaces of a second bracket 191b and a third bracket 191c, respectively, and may oppose the module case 410.

Since a second shaft 193b and a third shaft 193c are disposed in the second connection board 197b and the third connection board 197c, respectively, an opening or a groove in which the second shaft 193b and the third shaft 193c is disposed may be provided in the second connection board 197b and the third connection board 197c, respectively.

In the example embodiment, the first, second, and third elastic members 195a, 195b, and 195c disposed in the first, second, and third elastic support portions 190a, 190b, and 190c, respectively, may be formed of a shape memory alloy. In this case, when a current is applied to the first, second, and third elastic members 195a, 195b, and 195c, the first, second, and third elastic members 195a, 195b, and 195c may be deformed in a direction in which a length thereof decreases or increases, and when the supply of current is stopped, the first, second, and third elastic members 195a, 195b, and 195c may be restored to their original states.

Therefore, the optical path changing module 100-1 may rotate the first rotational holder 120 or the second rotational holder 130 by controlling a current using the properties of the shape memory alloy as described above.

To this end, the circuit board 430 may be electrically connected to the first, second, and third elastic members 195a, 195b, and 195c and may supply a current to the first, second, and third elastic members 195a, 195b, and 195c. For example, the conductive terminals 198 may be electrically connected to the circuit board 430 through the first connection wire 199a, and the first, second, and third shafts 193a, 193b, and 193c may be electrically connected to the circuit board 430 through the second connection wire 199b.

The first and second connection wires 199a and 199b may be formed of a conducting wire which may be stretched according to the rotation of the first rotational holder 120 or the second rotational holder 130. For example, the first and second connection wires 199a and 199b may be formed in the form of a coil and may be formed as a conductive wire which may be elastically stretched. However, the first and second connection wires 199a and 199b are not limited to the above-described example, and various modifications, such as forming the first and second connection wires 199a and 199b in the form of a flexible printed circuit board, may be made.

Each of the first, second, and third elastic support portions 190a, 190b, and 190c may include three conductive terminals 198 and a single shaft (the first, second, and third shafts 193a, 193b, and 193c, respectively). Accordingly, each of the first, second, and third elastic support portions 190a, 190b, and 190c may include three first connection wires 199a and a single second connection wire 199b.

The three first connection wires 199a may be configured as signal lines to which a current signal is input, and the single second connection wire 199b may be a common line or a ground line. Accordingly, the optical path changing module 100-1 may selectively apply a signal to the first, second, and third elastic members 195a, 195b, and 195c through the three first connection wires 199a, or may apply different signals to the first, second, and third elastic members 195a, 195b, and 195c, respectively.

Therefore, the first, second, and third elastic members 195a, 195b, and 195c may be deformed into the same shape or different shapes according to the applied signal, and may move or rotate the first, second, and third shafts 193a, 193b, and 193c.

The optical path changing module 100-1 may rotate the first rotational holder 120 and the second rotational holder 130 through the first, second, and third elastic support portions 190a, 190b, and 190c without a separate driver. Therefore, a weight of the optical path changing module 100-1 reduced in comparison to an optical path changing module including a separate driver. Also, since a magnet and a coil are not included in the optical path changing module 100-1, electromagnetic interference may be reduced.

Each of the first, second, and third elastic support portions 190a, 190b, and 190c may include three elastic members (three first elastic members 195a, three second elastic members 195b, and three third elastic members 195c, respectively) as an example, but the disclosure is not limited to such a configuration. For more accurate control, four or more elastic members may be included in each of the first, second, and third elastic support portions 190a, 190b, and 190c. In this case, corresponding numbers of the conductive terminals 198 and the first connection wires 199a may be provided.

This disclosure is not limited to the examples described herein, and various changes or modifications may be made. For example, in the embodiments described above, the first bracket is coupled to the first rotational holder and the first shaft is coupled to the second rotational holder. However, in an alternative example, the first bracket may be coupled to the second rotational holder and the first shaft may be coupled to the first rotational holder. Similarly, the second and third elastic support portions may be configured to couple the second and third brackets to the module case, and to couple the second and third shafts to the second rotational holder.

According to the aforementioned example embodiments, an optical path changing module and a camera module may have a simplified structure while implementing functions such as autofocusing adjustment, zooming, and optical image stabilization, may have a reduced size, and may reduce power consumption.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical path changing module, comprising:
a first rotational holder on which a reflective member configured to change a path of light is mounted;
a second rotational holder supporting the first rotational holder; and
a first elastic support portion disposed between the first rotational holder and the second rotational holder,
wherein the first elastic support portion includes:
a first shaft disposed along a first rotational axis that is a rotational axis of the first rotational holder, and fastened to either one of the first rotational holder and the second rotational holder;
a first bracket fastened to the other one of the first rotational holder and the second rotational holder and accommodating the first shaft therein; and
first elastic members connecting the first shaft to the first bracket.

2. The optical path changing module of claim 1, wherein the first rotational axis extends through the reflective member.

3. The optical path changing module of claim 1, wherein each of the first elastic members is formed as a plate-shaped member, and ends of each of the first elastic members are bent to form an acute angle.

4. The optical path changing module of claim 1, wherein the first elastic members are radially disposed around the first shaft, and
wherein one end of each of the first elastic members is coupled to the first shaft, and another end of each of the first elastic members is coupled to the first bracket.

5. The optical path changing module of claim 4, further comprising:
conductive terminals coupled to the first bracket,
wherein the other end of each of the first elastic members is connected to a respective one of the conductive terminals.

6. The optical path changing module of claim 5, wherein the first elastic member is formed of a shape memory alloy.

7. The optical path changing module of claim 6, further comprising:
a circuit board electrically connected to the conductive terminal and configured to supply a current to the first elastic member.

8. The optical path changing module of claim 1, wherein the first rotational holder includes a mounting surface on which the reflective member is mounted, and a shaft coupling portion disposed on a rear surface of the mounting surface and coupled to the first elastic support portion.

9. The optical path changing module of claim 8, wherein the second rotational holder includes two side portions disposed on opposite sides of the first rotational holder, respectively, and a connection portion connecting the two side portions, and
wherein a second rotational shaft penetrating the two side portions is disposed along a second rotational axis that is a rotational axis of the second rotational holder.

10. The optical path changing module of claim 9, further comprising:
a module case accommodating the second rotational holder; and
a circuit board coupled to the module case,
wherein the second rotational holder is coupled to the module case such that the second rotational holder is configured to rotate along the second rotational axis, with respect to the module case.

11. The optical path changing module of claim 10, further comprising:
a second elastic support portion disposed between the second rotational holder and the module case,
wherein the second elastic support portion includes:
a second shaft disposed along the second rotational axis and coupled to either one of the second rotational holder and the module case;
a second bracket fastened to the other one of the second rotational holder and the module case, and accommodating the second shaft therein; and
second elastic members connecting the second shaft to the second bracket.

12. The optical path changing module of claim 11, further comprising:
a second driver configured to rotate the second rotational holder about the second rotational axis,
wherein the second driver includes:
a second magnet portion coupled to the second bracket; and
a second coil portion disposed to oppose the second magnet portion, spaced apart from the second magnet portion, and coupled to the circuit board.

13. The optical path changing module of claim 1, further comprising:
a first driver configured to rotate the first rotational holder about the first rotational axis.

14. The optical path changing module of claim 13, wherein the first driver includes:
a first magnet portion coupled to the first bracket; and
a first coil portion disposed to oppose the first magnet portion and spaced apart from the first magnet portion.

15. A camera module, comprising:
an optical path changing module including a rotational holder on which a reflective member configured to change a path of light is mounted;
a module case accommodating the optical path changing module; and
elastic members connecting the rotational holder to the module case,
wherein the elastic members are radially disposed around a rotational axis formed by the rotational holder, one end of each of the elastic members is fastened to the rotational holder such that the one end is disposed inside the rotational axis, and another end of each of the elastic members is fastened to the module case.

16. The camera module of claim 15, further comprising:
a lens module accommodated in the module case and including lenses; and
an image sensor module configured to convert light passing through the lenses into an electrical signal.

17. A camera module, comprising:
a module case;
an optical path changing module disposed in an internal space of the module case, and including a first rotational holder on which a reflective member configured to change a path of light is mounted;
a first shaft coupled to the module case and forming a rotational axis of the first rotational holder; and
first elastic members extending radially outward from the first shaft such that one end of each of the first elastic members is connected to the first shaft at a point inside the rotational axis.

18. The camera module of claim 17, wherein another end of each of the first elastic members is connected to the first rotational holder.

19. The camera module of claim 17, further comprising a first ring-shaped bracket mounted in an opening in the rotational holder and disposed around the first shaft,
wherein another end of each of the first elastic members is connected to the first ring-shaped bracket.

20. A camera module, comprising:
a module case;
an optical path changing module disposed in an internal space of the module case, and including a first rotational holder on which a reflective member configured to change a path of light is mounted;
a first shaft coupled to the module case and forming a rotational axis of the first rotational holder;
first elastic members extending radially outward from the first shaft and connecting the first rotational holder to the first shaft;
a second rotational holder mounted on the first rotational holder and including a mounting surface on which the reflective member is mounted;
a second shaft coupled to the first rotational holder and forming a rotational axis of the second rotational holder that is perpendicular to the rotational axis of the first rotational holder; and
second elastic members extending radially outward from the second shaft and connecting the second rotational holder to the second shaft.

21. The camera module of claim 20, wherein one end of each of the second elastic members is connected to the second shaft, and another end of each of the second elastic members is connected to the second rotational holder.

22. The camera module of claim 20, further comprising a second ring-shaped bracket attached to the second rotation holder and disposed around the second shaft,
wherein one end of each of the second elastic members is connected to the second shaft, and another end of each of the second elastic members is connected to the second ring-shaped bracket.

* * * * *